United States Patent
Picot et al.

(10) Patent No.: US 9,528,611 B2
(45) Date of Patent: Dec. 27, 2016

(54) GATE VALVE WITH FLOATING SEAL

(71) Applicant: Definox SAS, Gétigné (FR)

(72) Inventors: Thierry Picot, Vallet (FR); Sébastien Fontenit, La Gaubretiere (FR)

(73) Assignee: DEFINOX SAS, Gétigné (FR)

( * ) Notice: Subject to any disclaimer, the term of this patent is extended or adjusted under 35 U.S.C. 154(b) by 9 days.

(21) Appl. No.: 14/466,012

(22) Filed: Aug. 22, 2014

(65) Prior Publication Data
US 2015/0060716 A1 Mar. 5, 2015

(30) Foreign Application Priority Data

Sep. 5, 2013 (EP) .................................... 13183138

(51) Int. Cl.
| | | |
|---|---|---|
| F16K 1/46 | (2006.01) | |
| F16K 1/44 | (2006.01) | |
| F16K 1/38 | (2006.01) | |
| F16K 37/00 | (2006.01) | |

(52) U.S. Cl.
CPC . *F16K 1/46* (2013.01); *F16K 1/38* (2013.01); *F16K 1/446* (2013.01); *F16K 37/0066* (2013.01)

(58) Field of Classification Search
CPC ........ F16K 1/38; F16K 37/0066; F16K 1/446; F16K 1/385; F16K 1/46
USPC ....... 251/333–334, 357; 137/247.15, 516.29, 137/516.27, 516.25, 538; 277/437, 438, 277/491, 641
See application file for complete search history.

(56) References Cited

U.S. PATENT DOCUMENTS

| | | | | |
|---|---|---|---|---|
| 511,734 A | * | 12/1893 | Hoffstadt ................. | F16J 15/20 277/530 |
| 2,873,132 A | * | 2/1959 | Tanner ..................... | F16J 15/32 220/378 |
| 2,983,533 A | * | 5/1961 | Tisch ....................... | F16J 15/32 277/649 |
| 3,507,505 A | * | 4/1970 | Jirka ....................... | B29C 57/025 277/625 |
| 3,542,380 A | * | 11/1970 | Klein ..................... | F16J 15/0887 277/639 |

(Continued)

FOREIGN PATENT DOCUMENTS

| | | |
|---|---|---|
| CN | 1836124 A | 9/2006 |
| CN | 201547374 U | 8/2010 |

(Continued)

*Primary Examiner* — Marina Tietjen
(74) *Attorney, Agent, or Firm* — Birch, Stewart, Kolasch & Birch, LLP

(57) ABSTRACT

A valve stem-plug and seal assembly includes a valve stem-plug having first and second axially spaced peripheral shoulders forming a groove there between. A floating seal gasket is arranged in the groove. The floating seal gasket is an annular ring with a central opening through which the valve stem-plug extends. Further, the outer surface of the floating seal gasket includes an upper and a lower circumferential extending segment, wherein the segments are arranged for sealing against a valve seat and thereby forming a double-contact seal. The outer surface of the floating seal is concave between the upper and lower circumferentially extending segments such that a leakage chamber is formed between the valve seat and said upper and lower circumferentially extending segments when the double-contact seal is formed. The floating seal gasket itself and a valve assembly in which the valve stem-plug and seal assembly is used are also disclosed.

12 Claims, 4 Drawing Sheets

(56) References Cited

U.S. PATENT DOCUMENTS

| | | | | |
|---|---|---|---|---|
| 3,642,293 | A * | 2/1972 | Woodling | F16J 15/32 277/558 |
| 3,990,711 | A * | 11/1976 | Hill | F16J 15/32 277/451 |
| 4,003,394 | A | 1/1977 | Adams | |
| 4,192,520 | A | 3/1980 | Hasegawa | |
| 4,398,732 | A * | 8/1983 | Christensen | F16L 21/02 277/604 |
| 5,040,905 | A * | 8/1991 | Boyd | F16C 17/02 384/130 |
| 5,085,241 | A | 2/1992 | Mieth | |
| 5,201,490 | A | 4/1993 | Maraud et al. | |
| 5,562,494 | A * | 10/1996 | Fujiwara | H01R 13/5205 439/275 |
| 5,797,604 | A * | 8/1998 | Inagaki | F16J 15/0893 277/618 |
| 6,056,003 | A * | 5/2000 | Madsen | F16K 1/446 137/240 |
| 6,145,753 | A * | 11/2000 | Yano | F25B 41/062 236/92 B |
| 6,260,851 | B1 * | 7/2001 | Baron | F16L 37/025 277/603 |
| 6,293,300 | B1 | 9/2001 | Dumke et al. | |
| 6,378,548 | B1 | 4/2002 | Norton et al. | |
| 6,557,858 | B1 * | 5/2003 | Carr | F16J 15/027 277/628 |
| 6,908,070 | B2 * | 6/2005 | Bartos | F16L 37/42 137/242 |
| 7,033,215 | B2 * | 4/2006 | Kobayashi | H01R 13/5205 439/587 |
| 7,066,927 | B2 * | 6/2006 | Chen | A61B 17/1646 137/625.69 |
| 7,234,704 | B2 * | 6/2007 | Lehr | F16J 15/3204 277/310 |
| 7,372,933 | B2 * | 5/2008 | Ohsono | F16J 15/0893 277/314 |
| 7,407,165 | B1 * | 8/2008 | Chisnell | F16L 21/02 277/603 |
| 8,297,593 | B2 | 10/2012 | Muzzo et al. | |
| 8,297,625 | B2 * | 10/2012 | Schmid | F16D 3/223 277/644 |
| 9,349,621 | B2 * | 5/2016 | Singh | F16J 15/062 |
| 9,388,902 | B2 * | 7/2016 | Sueyoshi | F16J 15/166 |
| 2004/0164496 | A1 * | 8/2004 | Okada | F02M 59/442 277/549 |
| 2005/0006617 | A1 * | 1/2005 | Leys | F16K 7/17 251/335.2 |
| 2010/0096578 | A1 | 4/2010 | Franz et al. | |
| 2012/0067924 | A1 * | 3/2012 | Deans | B05B 11/0048 222/256 |
| 2013/0020521 | A1 | 1/2013 | Byrne | |
| 2013/0053816 | A1 * | 2/2013 | DiPerna | A61M 5/1408 604/500 |

FOREIGN PATENT DOCUMENTS

| | | | |
|---|---|---|---|
| DE | 2141051 | | 2/1973 |
| DE | 2505544 A1 * | 8/1976 | F16K 1/385 |
| FR | 2526116 A1 * | 11/1983 | F16K 1/446 |

* cited by examiner

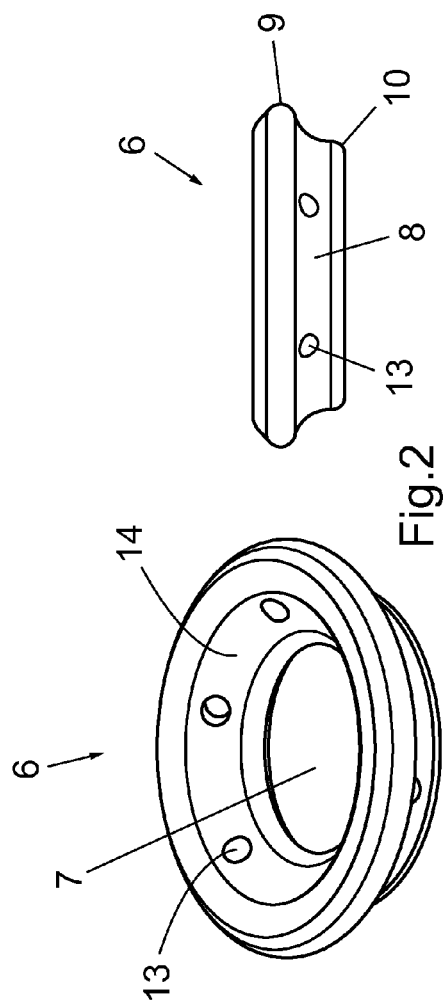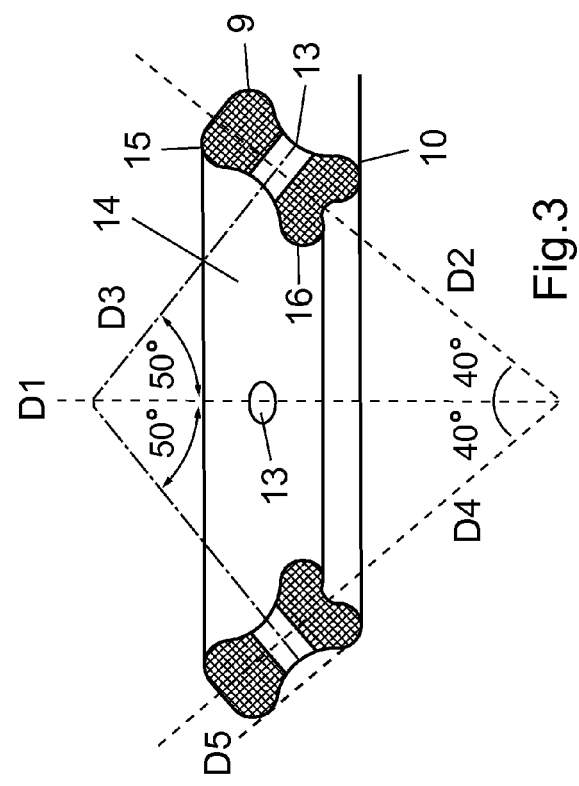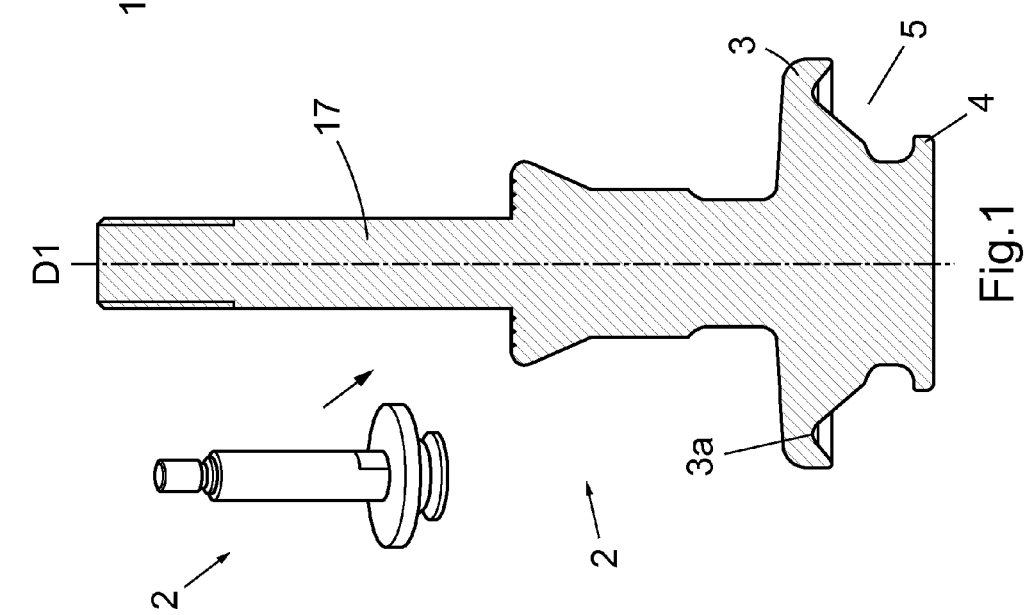

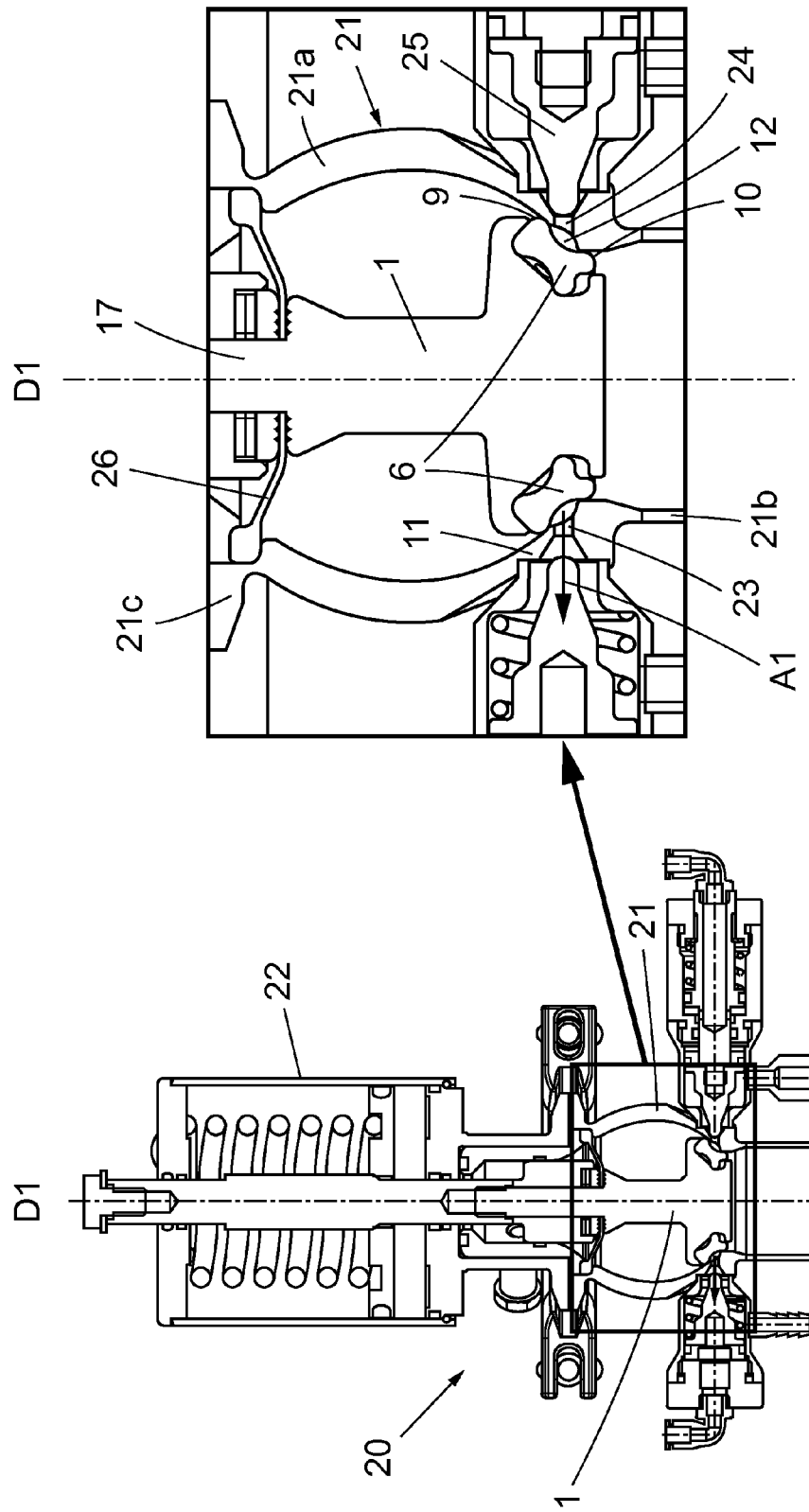

GATE VALVE WITH FLOATING SEAL

TECHNICAL FIELD

The invention relates to gate valve, and more particularly to gate valves used in application in which it is important to clean the gate valve periodically.

BACKGROUND ART

In for example the areas of food processing, pharmaceutical and cosmetics, purity commands are usually of highest priority. Gate valves are often used in such industries for opening and closing different lines.

The valves, after being in contact with one type of liquid or gas, usually need to be thoroughly cleaned before coming into contact with other liquids or gases in order to meet the high sanitary requirements and to avoid contamination by bacteria.

As an example, gate valves generally have some kind of gasket or gaskets which needs to be cleaned at regular intervals. These gaskets may be detached from the gate valve and be completely removed from the gate valve assembly before cleaning. This, however, means that the process has to be stopped and also usually requires manual interaction.

The cleaning is often performed with highly acidic or alkaline solutions to ensure that there is no contamination of bacteria or unwanted products. If for example rubber gaskets are used, these have to be replaced regularly due to degradation or crack formation that may arise in the rubber after repeated exposure to harsh cleaning conditions.

Document U.S. Pat. No. 5,201,490 shows a gate valve-seal assembly comprising a gate valve body inside of which a gate valve seat is formed. The valve is opened and closed by actuating a stem-plug, and a PTFE gasket is used for sealing against the gate valve seat. There is however a need in the art for improved valves for use when the sanitary requirements are of high importance.

SUMMARY

It is an object of the invention to at least partly overcome one or more of the above-identified limitations of the prior art. In particular, it is an object to provide a valve that may be cleaned-in-place (CIP), thus facilitating automatic operation of the cleaning process.

It is further an object of the invention to provide a double seat valve that is actuated by a single plug and that further provides for leakage detection.

As a first aspect of the invention, there is provided a valve stem-plug and seal assembly comprising
  a valve stem-plug having a first and second axially spaced peripheral shoulders forming a groove there between; and
  a floating seal gasket arranged in the groove; wherein the floating seal gasket is an annular ring with a central opening through which the valve stem-plug extends; and further wherein
  the outer surface of the floating seal gasket comprises an upper and a lower circumferential extending segment, wherein the segments are arranged for sealing against a valve seat and thereby forming an double-contact seal, and further wherein
  the outer surface of the floating seal is concave between the upper and lower circumferentially extending segments such that a leakage chamber is formed between the valve seat and the upper and lower circumferentially extending segments when the double-contact seal is formed.

The valve stem-plug and seal assembly according to the first aspect of the invention is advantageous in that it provides for a double sealing solution with a single seat valve. Thus, the valve stem-plug and seal assembly provides for a double seat solution that is actuated by a single plug. Due to the configuration of the floating seal gasket, both circumferential extending segments are capable of sealing against the valve seat, thereby forming a double seal. Thus, this provides for additional sealing capacity as compared to when for example a single seal is formed and it further allows for forming a double seal using only a single actuator for moving the assembly. Moreover, the valve stem-plug and seal assembly is configured so that a leakage chamber is formed between the double seals, i.e. between the contact points of the extending segments and the valve seat. Thus, in the event that one of the formed seals does not function properly, fluid that has passed a non-functioning seal may be detected in the leakage chamber.

A valve stem-plug refers to a plug connected to a stem that may be used in a valve. The shoulders of the plug may thus extend from the stem in the radial direction, i.e. in a direction that is perpendicular to the direction along the length of the stem. The groove formed between the two shoulders of the valve stem-plug is thus for holding or receiving a gasket.

The floating seal gasket is shaped as an annular ring, i.e. the gasket may be a diaphragm. The central opening of the gasket is thus the opening through which the valve stem-plug extends. The central opening may thus have a larger diameter than the width of the actual gasket material.

A "floating seal" refers to the gasket fitting loosely in axial and lateral directions in the groove of the valve stem-plug when the valve stem-plug is in an unsealing condition, i.e. when no double-contact is formed. The floating arrangement provides for outstanding cleaning capabilities. This means that upon dilating of the gasket when the valve stem-plug is in a non-sealing condition, the floating seal gasket it allows for circulation of cleaning fluid around all sides of the gasket without having to dismantle the gasket.

The outer surface of the gasket is thus the surface that may face or seal against a valve seat, whereas the inner surface of the floating seal gasket is the surface that faces the central opening, i.e. the surface that faces the valve-stem plug extending through the gasket. The gasket comprises two segments, an upper and a lower segment, that extend in the radial direction at the periphery of the floating seal. These segments extend so as to seal against a valve seat, thereby forming the double-contact seal comprising an upper and a lower sealing with the valve seat. Upon sealing, the gasket may be fixated and the segments may be pressed tight against the surface of the valve seat. Thus, in its sealing condition, i.e. when pressed in contact with a valve seat, the gasket may not be in a floating condition.

A valve seat may for example be a stop surface delimiting the orifice of a pipe in gate valve assembly.

The outer surface of the floating seal gasket is concave between the upper and the lower extending segments. This means that the outer surface is curving in, or is hollowed inward, between the upper and lower extending segments. The outer surface may thus form a C-shaped profile between the upper and lower segment such that the part of the outer surface located between the segments extend less in the radial direction as compared to the upper and lower extending segments. This further means that when the valve stem-plug and seal assembly is sealed against a valve seat, then a leakage chamber is formed between the valve seat and the concave surface between the extending segments. This leakage chamber may thus extend around the whole circumference of the seal gasket. The leakage chamber may thus be an annular leakage chamber.

In embodiments of the first aspect of the invention, the outer surface of the floating seal gasket comprises at least two through holes to the inner surface of the floating seal gasket, such that the leakage chamber also extends between the inner surface of the floating seal and the valve stem-plug.

This is advantageous in that the volume of the leakage chamber is extended. The through holes thus extend so that the outer surface of the gasket is in liquid or fluid communication with the inner surface of the gasket even when the valve stem-plug and seal assembly is in in a sealing position, i.e. when the double-contact is formed. Moreover, the through holes further allow detection of a leakage on both sides of the seal, i.e. a leakage on the inner side and the outer side, respectively.

As an example, the through holes may be equidistantly spaced around the circumference of the annular gasket. Further, the gasket may comprise an even number of through holes, such as four, six or eight through holes. The through holes may extend from the middle of the inner surface of the gasket to the middle of the outer surface of the gasket.

Moreover, the direction of the through holes may form an angle to the direction of the stem of the valve stem-plug and seal assembly. This means that a first imaginary straight line drawn through the direction of the through hole may form an angle with the direction of the stem, i.e. a direction of a second imaginary straight line drawn straight through the central opening of the gasket. This angle may be between 30° and 70°, such as between 40° and 60°, such as about 50°.

As a further example, also the inner surface of the floating seal gasket facing the valve stem-plug may comprise an upper and a lower circumferentially extending segment, such that the inner surface of the floating seal is concave.

The upper and lower circumferentially extending segment of the inner surface may also form part of the double-contact seal. Further, if sealing contact is lost between the upper and lower segments of the inner surface, product or leakage may be detected in the leakage chamber, e.g. due to the through holes of the floating seal gasket.

Thus, the cross section of the floating seal gasket may have an hourglass shape with rounded ends, i.e. wide at its ends and narrow in the middle. The cross section of the floating seal gasket is herein referred to as the cross section in the plane that comprises a line drawn along the extension of the stem.

If also the inner surface of the floating seal gasket is concave, then a larger leakage chamber is formed. The upper and lower circumferentially extending segments of the inner surface may be pressed and seal against the portion of the stem-plug that extend through the central opening of the gasket when the valve stem-plug and seal assembly is in a sealing position, i.e. when the double contact seal between the gasket and the valve seat is formed. Thus, a double contact may also be formed between the inner surface of the gasket and the portion of the stem-plug that extend through the central opening of the gasket.

In embodiments of the first aspect of the invention, the inner surface of the floating seal gasket may have a curvature that substantially mirrors the curvature of the outer surface.

The cross section of the gasket may extend in a direction that forms an angle with the extension of the stem. This angle may be about 30°-50°, such as about 40°. Thus, the extension of the cross section may be tilted relative the stem.

This further means that an imaginary straight line drawn in the cross section of the gasket from the middle of the inner surface to the middle of the outer surface forms an angle with the direction of the stem. This angle may be between 30° and 70°, such as between 40° and 60°, such as about 50°.

In embodiments of the first aspect of the invention, the upper circumferentially extending segment of the outer surface of the floating seal gasket extends further in the radial direction as compared to the lower circumferentially extending segment of the outer surface of the floating seal gasket. This may aid in sealing against the valve seat.

In embodiments of the first aspect of the invention, the first peripheral shoulder is adjacent to an end of the valve stem. Thus, the stem may be connected directly to the first, or upper, peripheral shoulder. In other words, the two peripheral shoulders, together with the groove in between, may form the "plug" of the valve stem-plug.

Moreover, in embodiments of the first aspect of the invention, the peripheral shoulders have a circular cross section. The cross section with respect to the shoulders of the valve stem-plug and seal assembly refers to the cross section in the plane that is perpendicular to a line drawn along the extension of the stem. Thus, each of the peripheral shoulders may be shaped as a disc.

In embodiments of the first aspect of the invention, the floating seal gasket is a plastic seal gasket.

It may be advantageous to use a plastic gasket since such gaskets may withstand the harsh conditions used during cleaning.

In embodiments of the first aspect of the invention, the floating seal gasket comprises perfluoroalkoxy (PFA). PFA is a fluoropolymer and has been found to have excellent properties for cleaning-in-place (CIP) applications. For example, the PFA may retain its mechanical properties even after being in contact with alkali or acidic solution used when cleaning the gasket. The plastomer structure of PFA decreases the risk of porosity or cracking of the floating seal gasket, which in turn decreases the risk of contamination and development of bacteria within the seal.

As an example, the floating seal gasket may consist entirely of PFA.

Furthermore, a floating seal gasket comprising PFA may be attached to the grove of the stem-plug by first heating the gasket to about 150° C., then put the seal in place, and then lower the temperature to room temperature, such as about 20° C. This may secure that the PFA gasket or gasket comprising PFA do not accidentally slip over any of the two shoulders of the plug-stem. Instead, in order for the PFA seal to be removed from the groove, it may have to be cut.

It is further to be understood that the gasket may comprise or consist of other fluoropolymers, such as polytetrafluoroethylene (PTFE) or fluorinated ethylene-propylene (FEP).

Consequently, the valve stem-plug and seal assembly may be "rubber-free", i.e. having seals etc. containing no rubber. Thus, the parts of the stem-plug and seal assembly that are arranged to be in contact with the liquid, or fluid, may be free of rubber. This is advantageous in that rubber may be degraded in the harsh conditions during cleaning of the valve.

As a second aspect of the invention, there is provided a floating seal gasket (6) for a valve stem-plug; wherein the floating seal gasket has the form of an annular ring with a central opening, and wherein the outer surface of the floating seal gasket comprises an upper and a lower circumferential extending segment, and further wherein the outer surface of the floating seal gasket is concave between the upper and lower circumferentially extending segments.

The terms and definitions used in relation to the second aspect is as discussed under the first aspect above.

In embodiments of the second aspect of the invention, the outer surface of the floating seal gasket comprises at least two through holes to the inner surface of the floating seal gasket.

Furthermore, as discussed under the first aspect above, also the inner surface of the floating seal gasket may comprises an upper and a lower circumferentially extending segment, such that the inner surface of the floating seal is concave.

The floating seal gasket may comprise or consist of a material as discussed in relation to the first aspect above.

In embodiments of the second aspect of the invention, the floating seal gasket comprises perfluoroalkoxy (PFA).

As a third aspect of the invention, there is provided a valve assembly comprising
a housing having inlet and outlet ports and a valve seat there between
a valve stem-plug assembly according to the first aspect of the invention disposed within the housing;
means for actuating the valve stem-plug assembly to sealingly engage the valve stem-plug assembly with the valve seat for transferring the valve assembly from an open position, in which fluid flow from the inlet to the outlet ports is permitted, to a sealing position, in which fluid flow from the inlet to the outlet ports is blocked, and wherein
the upper and a lower circumferential extending segments of the floating seal gasket of the valve stem-plug assembly seal against the valve seat so as to form a double contact seal when the valve assembly is in the sealing position, thereby blocking fluid flow from the inlet to the outlet ports.

The valve assembly of the second aspect of the invention thus provides for a double seal using only a single means for actuating the valve stem-plug and seal assembly, e.g. a single actuator may be used for providing a double seal at the valve seat. The valve assembly further provides for a hygienic design since it facilitates a non-threaded assembly.

The housing may comprise a frusto-spherical portion with an inlet port or inlet ports arranged on one side of the frusto-spherical portion and an outlet port, or outlet ports, arranged on the outer side of the frusto-spherical portion. A frusto spherical portion refers to a sphere cut off by two planes at two opposite ends, i.e. a sphere from which two opposite spherical caps have been removed.

The valve seat may be located within or at the border of the frusto-spherical portion, e.g. the actual double contact seal may be formed at the end of the frusto-spherical portion.

The means for actuating the valve stem-plug assembly may be means for linearly actuating the assembly, such as an actuator. The actuator may be a pneumatic actuator, i.e. operated by pneumatic pressure. However, the actuator may also be operated using e.g. hydraulic fluid pressure.

Upon movement of the means for actuating the valve stem-plug and seal assembly, the valve is switched between an open position, when there is no contact between the floating seal gasket and the valve seat, and a closed or sealing position, in which the floating seal gasket is pressed against the valve seat.

In embodiments of the third aspect of the invention, the valve seat further comprises at least one leakage detection port arranged for allowing fluid present within the leakage chamber to flow through the port when the double contact seal is formed.

The at least one leakage detection port may thus function as a leakage indication and alert an operator or a system that there is a leakage in one of the formed seals of the double contact seal. As an example, there may be a micro valve connected to the at least one leakage port for regulating opening and closing of the leakage detection port. Moreover, the gate valve may further comprise be means connected to the leakage detection port for detecting fluid that has passed from the leakage chamber through leakage detection port.

The at least one leakage detection port may be arranged at the gate valve seat wall at a location between the upper and lower circumferential extending segment of the floating seal gasket when the gate valve is in a sealing position.

The leakage detection port may be a micro valve. Normally, this valve may be open.

In embodiments of the third aspect of the invention, the gate valve further comprises at least one access port for a cleaning device arranged so as to permit fluid access to the leakage chamber when the double contact seal is formed.

This provides the option for cleaning the leakage chamber and the leakage detection port when the gate valve is in a sealing position. The at least one access port for a cleaning device may be different from the at least one leakage detection port. As an example, the gate valve may comprise one leakage detection port and one access port for a cleaning device. These may be located on the opposite each other on the wall of the valve seat.

Furthermore, there may be a micro valve connected to the at least one access port for a cleaning device for regulating opening and closing of the access port for a cleaning device. The access port for a cleaning device may be normally closed, i.e. only open when cleaning is about to take place.

The at least one access port for a cleaning device may be arranged at the gate valve seat wall at a location between the upper and lower circumferential extending segment of the floating seal gasket when the gate valve is in a sealing position.

In embodiments of the third aspect of the invention, the gate valve is further comprising a cleaning device for supplying a cleaning fluid to the least one access port for a cleaning device.

The cleaning device may for example be a device for delivering acidic solutions, alkaline solutions and/or steam to the gate valve.

Thus, when the gate valve is in a sealing position, cleaning fluid, such as a cleaning liquid or cleaning gas, may be introduced or pumped into the leakage chamber via the access port for a cleaning device, and the be removed from the leakage chamber via the leakage detection port.

The floating seal gasket in itself may be cleaned when the gate valve is in an open position, i.e. when the gasket is in a dilated state. Then, cleaning liquid or fluid may be introduced in the housing in which the stem-plug and seal assembly resides.

BRIEF DESCRIPTION OF THE DRAWINGS

Embodiments of the invention will now be described, by way of example, with reference to the accompanying schematic drawings, in which FIG. 1 shows a side view and a cross section of a stem-plug according to an embodiment of the present disclosure.

FIG. 2 shows a perspective view and a side view of a floating seal gasket according to an embodiment of the present disclosure.

FIG. 3 is a cross-sectional view of the floating seal gasket of FIG. 2.

FIG. 4a shows a side view of valve assembly according to an embodiment of the present disclosure when the valve assembly is in its sealing position. FIG. 4b shows a close up view of the valve seat of FIG. 4a as the valve is in its sealing position

DETAILED DESCRIPTION

Figure 6:
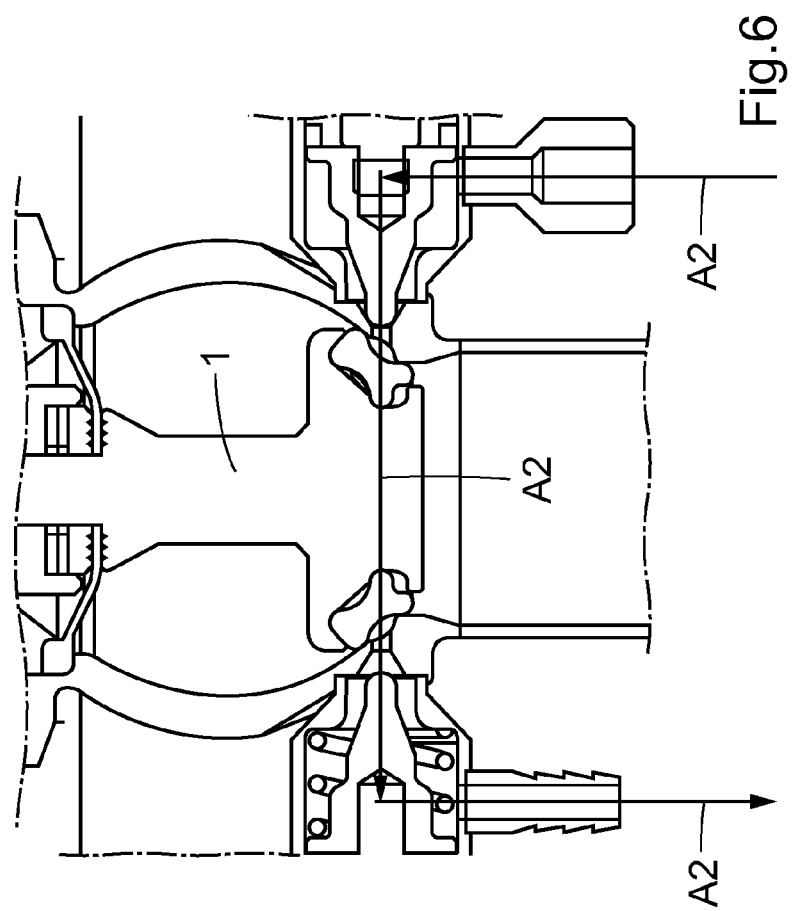
FIG. 6 shows how the leakage chamber of the assembly of FIG. 4 may be rinsed as the valve assembly is in its sealing position.

FIG. 1 shows a valve stem-plug 2 according to an embodiment of the present invention. The valve stem-plug 2 comprises an elongated shaft, or stem 17, as well as a first, upper peripheral shoulder 3 and a second lower peripheral shoulder 4. Both shoulders 3 and 4 have circular cross section, i.e. they are circular in the plane that is perpendicular to the direction D1 of the stem 17. The first shoulder 3 is adjacent to the end of the stem 17 and extend further in the radial direction as compared to the second peripheral shoulder 4. The second lower shoulder 4 forms one end of the valve stem-plug 2. The other end of the valve stem-plug 2, i.e. the end of the stem 17 that is not adjacent to the first peripheral shoulder 3, is adapted for an actuator. In other words, an actuator may be arranged at this other end of the stem 17 for linear movement along axis D1 of the valve stem plug 2. A groove 5 is formed between the first shoulder 3 and the second shoulder 4. This groove 5 is for holding a floating seal gasket 6. The first peripheral shoulder further 3 further has at its periphery a downwardly sloping flange 3a that aids in retaining a floating seal gasket in the groove 5.

FIG. 2 shows a perspective view as well as a side view of a floating seal gasket 6 of the present disclosure. The gasket is made of perfluoroalkoxy (PFA) and may fit and be retained in the groove 6 of the valve stem-plug 2 so as to form a floating seal, i.e. it fits loosely in axial and lateral directions in the groove of the valve stem-plug 2 when the valve stem-plug 2 is in an unsealing condition. The floating seal gasket 6 is shaped as an annular ring having a central opening 7, through which the valve stem-plug 2 extend when the gasket 6 is retained in the groove 6. The outer surface 8 of the gasket 6 further comprises an upper circumferential extending segment 9 as well as a lower circumferential extending segment 10. These segments are formed as annular flanges extending from the outer surface 8 of the gasket 6. The gasket 6 further comprises through holes 13 extending from the outer surface 8 to the inner surface 14 of the gasket. In this case, the gasket 6 comprises four through holes 13 that are equidistantly spaced around the circumference of the gasket.

FIG. 3 is a cross section of the floating seal gasket 6 of FIG. 2 and shows further in detail the shape of the gasket 6. The first extending segment 9 extend further in the radial direction than the second extending segment 10, i.e. segment 9 extend further from axis D1, which is along the direction of the stem 17 when the gasket 6 is retained in the groove 6 of the valve stem-plug 2, as compared to extending segment 10. The segments 9 and 10 have a rounded shape and the outer surface 8 is concave between the segments 9.

In this case, also the inner surface 14, i.e. the surface that faces the valve stem-plug 2 when the gasket 6 is retained in the groove 6 of the valve stem-plug 2, comprises an upper circumferentially extending segment 15 as well as a lower circumferentially extending segment 16. The inner surface 14 and the outer surface 8 have substantially identical but mirrored surface profiles, i.e. the surface profile of the inner surface 14 is the surface profile of the outer surface 8 when "flipped" over axis D2 in FIG. 3. The concave portions of the outer surface 8 and the inner surface 14 thus form C-shaped cross sections with openings facing away from each other. This means that the cross section of the gasket 6 forms an hourglass shape with rounded ends, i.e. like a "dog bone-shape". The cross section of the gasket 6 is extend along direction that is tilted relative the axis D1 that extend straight through the central opening 7, i.e. the axis D1 extend along the direction of the stem 17 when the gasket 6 is retained in the groove 6 of the valve stem-plug 2. This is illustrated in FIG. 3 with the axes D2 and D4, which form an angle of about 40° with the axis D1. In other words, an imaginary straight line drawn from the outermost point of the first extending segment 9 to the outermost point of the second extending segment 13, as shown via line D5, also forms an angle of about 40° with the axis D1. Furthermore, the through holes 13 are located centrally on the outer surface 8 and the inner surface 14. Due to the tilted cross section of the floating seal gasket 6, the through holes also extend in a direction that forms an angle with the axis D1. This is illustrated with axes D3 that forms an angle of about 50° with the axis D1.

FIGS. 4a and 4b show a cross section of a valve assembly 20 according to an embodiment of the present disclosure. The valve assembly comprises a housing 21 in which a valve stem-plug assembly 1 is mounted. The valve stem-plug assembly 1 thus comprises a valve stem-plug 2 that retains a floating seal gasket 6 in its groove. The valve assembly comprises a valve seat 11 and outlet ports (not shown) on one side of the valve seat 11 and inlet ports (not shown) on the opposite side of the valve seat 11. The upper part of the valve assembly 20 may thus form or be connected to a first line and the lower part of the valve assembly that is opposite the gate valve 11 compared to the upper part, may thus form or be connected to a second line. Consequently, the valve assembly 20 may be used to allow or block fluid flow from the first to the second line or vice versa.

The valve assembly 20 has a frusto-spherical portion 21a attached to two cylindrical portions 21b and 21c and the valve seat 11 is arranged at one end of the portion 21a, i.e. the valve seat 11 is arranged at the border between the frusto-spherical portion 21a and a cylinder shaped portion 21b.

There is also an upper diaphragm seal 26 arranged at the stem between the plug and the actuator. The seal 26 may be of PTFE and may open and close by deformation due to the flexibility of the upper seal 26. Consequently, the valve assembly may have seals that contain no rubber, i.e. the parts of the valve that are arranged to be in contact with the liquid or fluid may be rubber-free.

An actuator 22 is arranged on the stem 17 for moving the valve stem-plug and seal assembly 1 in the linear direction along axis D1 so as to transfer the valve assembly 20 from an open position to a closed position. The actuator 22 is a pneumatic actuator. In FIGS. 4a and b, the valve assembly is in its closed position, i.e. the valve stem-plug and seal assembly 1 is pressed against the valve seat 11 such that the upper circumferential segment 9 and the lower circumferential segment 10 is pressed against the surface of the valve seat 11, thereby forming a double-contact seal. In this closed position, fluid flow is blocked at the valve seat 11, which means that fluid may not flow from an inlet port arranged at one side of the valve seat 11 to an outlet port arranged on the other side of the valve seat 11.

Figure 5:
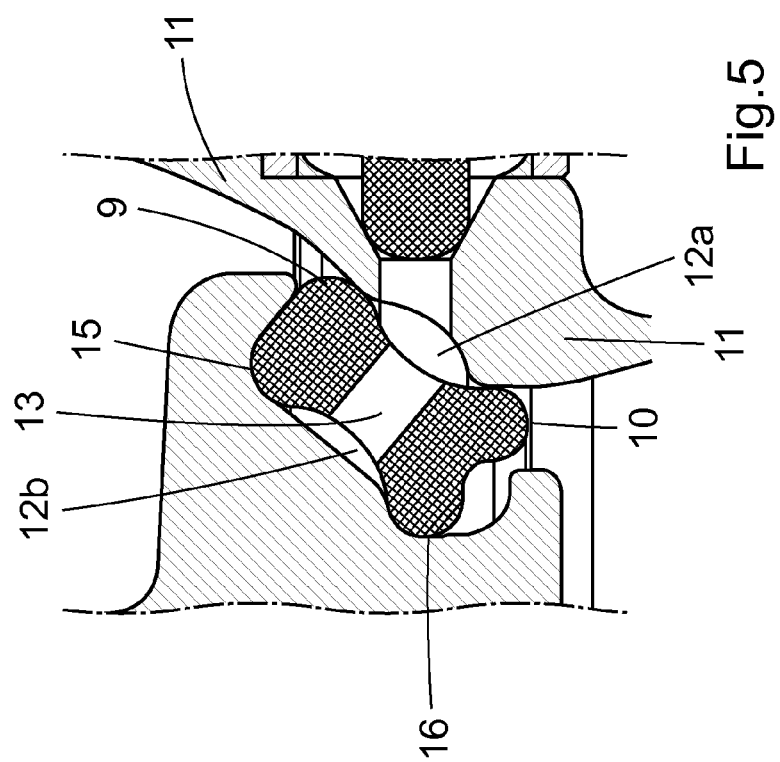
FIG. 5 shows a close-up view of the formed double-contact seal the valve assembly of FIG. 4 is in its sealing position.

A close-up view of the formed double contact seal is shown in FIG. 5. Due to the concave outer surface of the gasket 6, an annular leakage chamber 12 is formed by the volume 12a between the surface of the valve seat 1 and the gasket 6. Due to the through holes 13 of the gasket 6, this leakage chamber 12 further extends to the volume 12b formed between the inner surface of the gasket 6 and the stem-plug extending through the central opening 7 of the gasket 6. The upper circumferentially extending segment 15 of the inner surface of the gasket 6 and the lower circumferentially extending segment 16 of the inner surface of the gasket 6 is pressed against the surface of the stem-plug when the double contact seal is formed.

The valve assembly 20 further comprises a leakage detection port 23 arranged in the wall of the valve seat 11 at a position that faces the concave portion of the outer surface of the gasket 6. In other words, the leakage detection port 23 permits access to the formed leakage chamber 12 when the valve assembly 20 is in its sealing position. The opening and closing of the leakage detection port 23 is regulated by a micro valve arranged within the port. The micro valve piston may be of PTFE. As an example, the leakage detection port 23 may be arranged to automatically close as the valve assembly 20 turns form a closed to an open position, e.g. be closed as the actuator moves the stem in a longitudinal direction.

Thus, any fluid, such as a gas or liquid, present in the leakage chamber 12 may be detected via the leakage detection port 23, i.e. liquid or fluid may flow through the detection port 23 when the port is opened, as indicated by arrow A1 in FIG. 4. The presence of the through holes 13 further provides for leakage detection within volume 12b of the leakage chamber 12. Thus, the leakage detection port 23 provides for assuring that the sealing capacity of the valve assembly 20 is functioning or if for example the gasket 6 needs to be replaced.

FIG. 6 further shows how the leakage chamber may be cleaned. The valve assembly 20 comprises an access port 24 for a cleaning device 25. This port 24 is also located in the wall of the valve seat 11 at a position that faces the concave portion of the outer surface of the gasket 6, but on the side opposite the leakage detection port 23. A micro valve arranged within the port 24 controls opening and closing of the valve. The port 24 allows for rinsing of the leakage chamber 12, as well as ports 23 and 24. During rinsing, both port 24 and port 25 are opened, and cleaning fluid, such as a cleaning liquid, may be introduced into the leakage chamber 12 via port 24, flow through the entire leakage chamber 12 and then flow out of port 23, as indicated by the arrows in FIG. 6. Thus, the ports allows for cleaning-in-place (CIP) of the entire leakage chamber, which may minimize the risk of e.g. contamination by bacteria.

Figure 8:
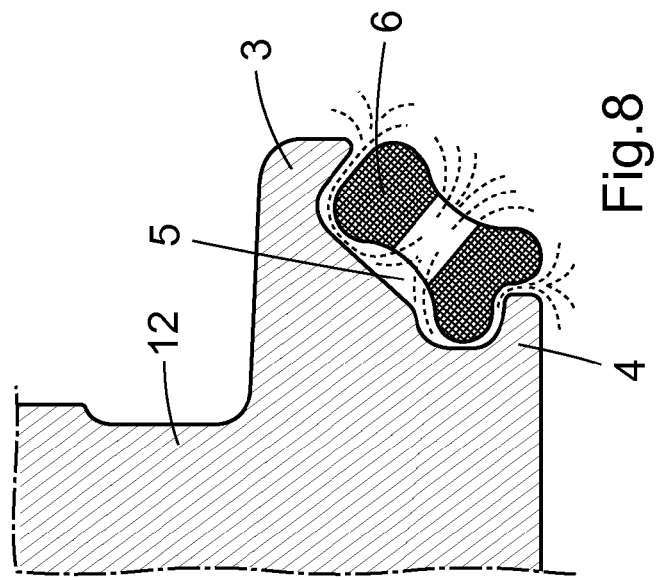
FIG. 8 shows how the floating seal gasket may be rinsed when the valve assembly is in its open position.
Figure 7:
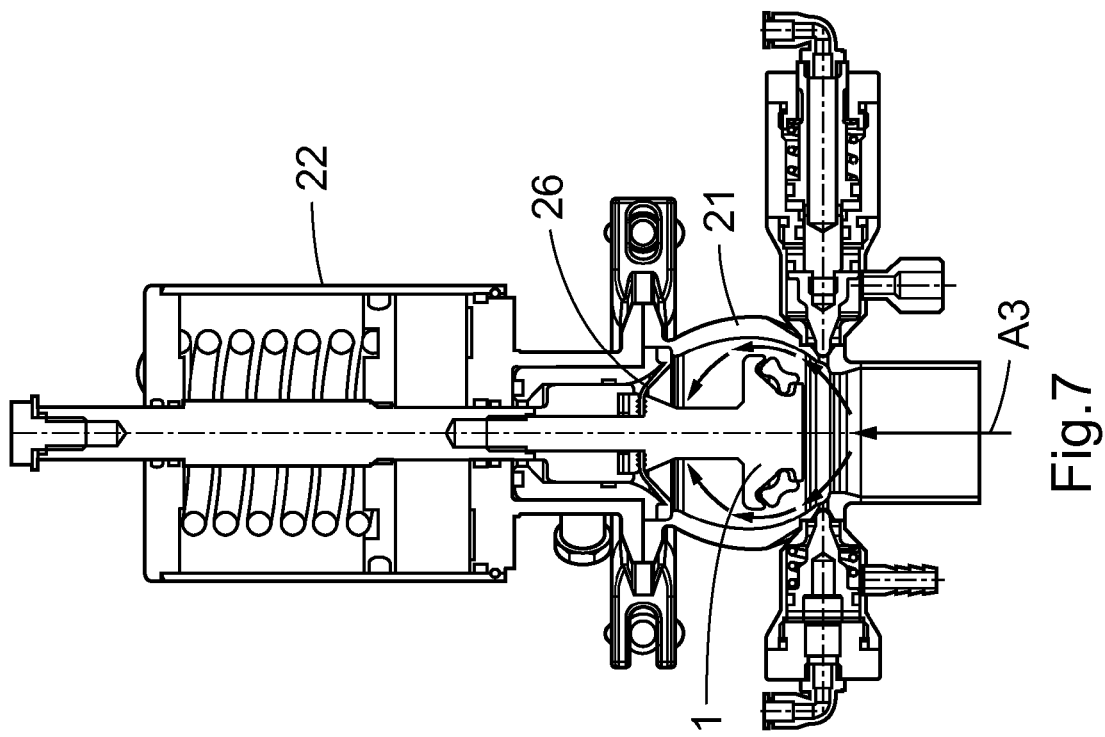
FIG. 7 shows a side view of valve assembly of FIG. 4 when the valve assembly is in its open position.

FIG. 7 further shows a cross section of the valve assembly 20 when the valve assembly 20 is in an open position. In the open position, fluid is allowed to flow from an inlet port arranged at one side of the valve seat 11 to an outlet port arranged on the other side of the valve seat 11, as indicated by the arrows in FIG. 7. The valve assembly 20 is switched from the closed to the open position upon linear movements initiated by the actuator arranged in contact with the stem of the valve stem-plug and seal assembly 1. Upon linear movement of the valve stem-plug and seal assembly 1, the upper diaphragm seal may change from an open to a closed position, due to its flexible properties. Thus, the PTFE diaphragm seal may thus be arranged bend inward and outward in the closed and open positions FIG. 8 further shows a cross section of the floating seal gasket 6 retained in the groove 5 between the upper and lower shoulders 3 and 4 of the valve-stem-and plug 2 of the valve assembly 2 of FIG. 7, i.e. when the valve assembly 20 is in the open position. In this position, when no double contact seal is formed, the gasket is in a dilated state and it allows for cleaning the entire gasket 6 due to the "floating seal" characteristics of the gasket 6. The cleaning of the floating seal gasket is performed by introducing a cleaning fluid in the housing 21. The cleaning fluid may be an acidic or alkaline liquid, or gas.

From the description above follows that, although various embodiments of the invention have been described and shown, the invention is not restricted thereto, but may also be embodied in other ways within the scope of the subject-matter defined in the following claims.

The invention claimed is:

1. A valve stem-plug and seal assembly comprising:
   a valve stem-plug having first and second axially spaced peripheral shoulders forming a groove there between; and
   a floating seal gasket arranged in said groove,
   wherein the floating seal gasket is an annular ring with a central opening through which the valve stem-plug extends,
   wherein an outer surface of the floating seal gasket comprises an upper and a lower circumferential extending segment, said upper and lower circumferential extending segments being arranged for sealing against a valve seat and thereby forming a double-contact seal,
   wherein the outer surface of the floating seal is concave between said upper and lower circumferentially extending segments such that a leakage chamber is formed between the valve seat and said upper and lower circumferentially extending segments when said double-contact seal is formed,
   wherein the valve stem-plug has a sealing position when engaged with a valve seat and an unsealing position when not engaged with a valve seat, and
   wherein the floating seal gasket is movable in an axial direction and a lateral direction while retained in said groove when the valve stem-plug is in the unsealing position.

2. The valve stem-plug and seal assembly according to claim 1, wherein the outer surface of the floating seal gasket comprises at least two through holes extending from the outer surface to the inner surface of the floating seal gasket, such that said leakage chamber extends from the valve seat to the valve stem-plug.

3. The valve stem-plug and seal assembly according to claim 1, wherein the floating seal gasket is a plastic seal gasket.

4. The valve stem-plug and seal assembly according to claim 1, wherein the floating seal gasket comprises perfluoroalkoxy.

5. The valve stem-plug and seal assembly according to claim 1, wherein the upper circumferentially extending segment of the outer surface of the floating seal gasket extends further in the radial direction as compared to the lower circumferentially extending segment of the outer surface of the floating seal gasket.

6. The valve stem-plug and seal assembly according to claim 1, wherein the first peripheral shoulder is adjacent to an end of the valve stem.

7. The valve stem-plug and seal assembly according to claim 1, wherein the peripheral shoulders have a circular cross section.

8. A valve assembly comprising:
   a housing having inlet and outlet ports and a valve seat there between;
   the valve stem-plug and seal assembly according to claim 1, disposed within said housing; and
   an actuator configured to actuate the valve stem-plug and seal assembly to sealingly engage said valve stem-plug and seal assembly with said valve seat for transferring the valve assembly from an open position, in which fluid flow from said inlet port to said outlet port is permitted, to a sealing position, in which fluid flow from said inlet port to said outlet port is blocked,
   wherein said upper and lower circumferential extending segments of the floating seal gasket of said valve stem-plug and seal assembly seal against said valve seat so as to form a double contact seal when said valve assembly is in said sealing position, thereby blocking fluid flow from said inlet port to said outlet port.

9. The valve assembly according to claim 8, wherein said valve seat further comprises at least one leakage detection port arranged for allowing fluid present within said leakage chamber to flow through said port when said double contact seal is formed.

10. The valve assembly according to claim 9, further comprising at least one access port for a cleaning device arranged so as to permit fluid access to said leakage chamber when said double contact seal is formed.

11. The valve assembly according to claim 10, further comprising a cleaning device for supplying a cleaning fluid to said least one access port for a cleaning device.

12. A valve stem-plug and seal assembly comprising:
   a valve stem-plug having first and second axially spaced peripheral shoulders forming a groove there between; and
   a floating seal gasket arranged in said groove,
   wherein the floating seal gasket is an annular ring with a central opening through which the valve stem-plug extends,
   wherein an outer surface of the floating seal gasket comprises an upper and a lower circumferential extending segment, said upper and lower circumferential extending segments being arranged for sealing against a valve seat and thereby forming a double-contact seal,
   wherein the outer surface of the floating seal is concave between said upper and lower circumferentially extending segments such that a leakage chamber is formed between the valve seat and said upper and lower circumferentially extending segments when said double-contact seal is formed, and
   wherein an inner surface of the floating seal gasket facing the valve stem-plug comprises an upper and a lower circumferentially extending segment, such that said inner surface of the floating seal is concave.

* * * * *